United States Patent
Reckker et al.

(10) Patent No.: US 12,271,049 B2
(45) Date of Patent: *Apr. 8, 2025

(54) VEHICULAR CAMERA WITH ADHESIVE DISPOSED BETWEEN NON-AXIALLY OPPOSED SURFACES OF THE LENS BARREL AND PCB STRUCTURE

(71) Applicant: Magna Electronics Inc., Auburn Hills, MI (US)

(72) Inventors: Martin J. Reckker, Troy, MI (US); Steven V. Byrne, Goodrich, MI (US); Rene Dreiocker, Rochester Hills, MI (US); Jonathan D. Conger, Berkley, MI (US); Jose Luis Zamudio Cabral, Rochester Hills, MI (US); Jazmin Hortensia Gallardo Gabaldon, Rochester Hills, MI (US); Robert A. Devota, Durand, MI (US); Matthew C. Sesti, Williamston, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,927

(22) Filed: Feb. 13, 2023

(65) Prior Publication Data

US 2023/0194828 A1 Jun. 22, 2023

Related U.S. Application Data

(63) Continuation of application No. 16/948,970, filed on Oct. 8, 2020, now Pat. No. 11,579,400.

(Continued)

(51) Int. Cl.
*G02B 7/02* (2021.01)
*H04N 23/51* (2023.01)
(Continued)

(52) U.S. Cl.
CPC ............. *G02B 7/025* (2013.01); *G02B 7/021* (2013.01); *H04N 23/51* (2023.01); *H04N 23/54* (2023.01); *H04N 23/55* (2023.01)

(58) Field of Classification Search
CPC ........ G02B 7/025; G02B 7/021; H04N 23/51; H04N 23/54; H04N 23/55
(Continued)

(56) References Cited

U.S. PATENT DOCUMENTS

| | | |
|---|---|---|
| 5,412,510 A | 5/1995 | Iizuka et al. |
| 5,550,677 A | 8/1996 | Schofield et al. |

(Continued)

*Primary Examiner* — Matthew David Kim
(74) *Attorney, Agent, or Firm* — HONIGMAN LLP

(57) ABSTRACT

A vehicular camera includes a PCB having an imager disposed thereat, a lens barrel accommodating a lens, and a lens barrel support structure that protrudes from the PCB and at least partially circumscribes the imager. The lens barrel has an outer surface between the ends of the lens barrel. The outer surface of the lens barrel is adhesively bonded to an inner surface of the lens barrel support structure via adhesive. The outer surface of the lens barrel opposes the inner surface of the lens barrel support structure. With the adhesive in its uncured state and contacting the opposed surfaces, the imager is aligned with the lens accommodated at the lens barrel. With the imager aligned with the lens, the adhesive is cured to adhesively attach the lens barrel at the lens barrel support structure.

5 Claims, 8 Drawing Sheets

Related U.S. Application Data

(60) Provisional application No. 62/939,067, filed on Nov. 22, 2019, provisional application No. 62/913,288, filed on Oct. 10, 2019, provisional application No. 62/912,214, filed on Oct. 8, 2019.

(51) Int. Cl.
*H04N 23/54* (2023.01)
*H04N 23/55* (2023.01)

(58) Field of Classification Search
USPC .......................................... 348/148
See application file for complete search history.

(56) References Cited

U.S. PATENT DOCUMENTS

| | | | |
|---|---|---|---|
| 5,670,935 A | 9/1997 | Schofield et al. | |
| 5,949,331 A | 9/1999 | Schofield et al. | |
| 5,978,017 A | 11/1999 | Tino | |
| 6,151,065 A | 11/2000 | Steed et al. | |
| 7,038,577 B2 | 5/2006 | Pawlicki et al. | |
| 7,595,943 B2 | 9/2009 | Yuan | |
| 7,720,580 B2 | 5/2010 | Higgins-Luthman | |
| 7,855,755 B2 | 12/2010 | Weller et al. | |
| 7,965,336 B2 | 6/2011 | Bingle et al. | |
| 8,542,451 B2 | 9/2013 | Lu et al. | |
| 8,994,878 B2 | 3/2015 | Byrne et al. | |
| 9,077,098 B2 | 7/2015 | Latunski | |
| 9,233,641 B2 | 1/2016 | Sesti et al. | |
| 9,277,104 B2 | 3/2016 | Sesti et al. | |
| 9,596,387 B2 | 3/2017 | Achenbach et al. | |
| 9,621,769 B2 | 4/2017 | Mai et al. | |
| 9,871,971 B2 | 1/2018 | Wang et al. | |
| 10,142,532 B2 | 11/2018 | Mleczko | |
| 10,207,646 B2 | 2/2019 | Oh | |
| 10,230,875 B2 | 3/2019 | Mleczko et al. | |
| 10,250,004 B2 | 4/2019 | Conger et al. | |
| 10,272,857 B2 | 4/2019 | Conger et al. | |
| 10,274,812 B1 | 4/2019 | Chen | |
| 10,676,041 B2 | 6/2020 | Sesti et al. | |
| 11,579,400 B2 | 2/2023 | Reckker et al. | |
| 2001/0055073 A1 | 12/2001 | Shinomiya | |
| 2003/0090569 A1 | 5/2003 | Poechmueller | |
| 2003/0128291 A1 | 7/2003 | Harazono et al. | |
| 2004/0069998 A1 | 4/2004 | Harazono | |
| 2007/0146908 A1 | 6/2007 | Li | |
| 2007/0200053 A1 | 8/2007 | Nomura et al. | |
| 2009/0244361 A1 | 10/2009 | Gebauer et al. | |
| 2011/0025850 A1 | 2/2011 | Maekawa et al. | |
| 2011/0279675 A1* | 11/2011 | Mano | H04N 23/55 |
| | | | 348/148 |
| 2011/0298925 A1 | 12/2011 | Inoue et al. | |
| 2012/0019940 A1 | 1/2012 | Lu et al. | |
| 2013/0130937 A1 | 5/2013 | Sun et al. | |
| 2013/0183499 A1 | 7/2013 | Kido et al. | |
| 2013/0242099 A1 | 9/2013 | Sauer et al. | |
| 2014/0298642 A1 | 10/2014 | Sesti et al. | |
| 2014/0313337 A1* | 10/2014 | Devota | B60R 11/04 |
| | | | 348/148 |
| 2014/0373345 A1 | 12/2014 | Steigerwald | |
| 2015/0015713 A1 | 1/2015 | Wang et al. | |
| 2015/0029337 A1 | 1/2015 | Uchiyama et al. | |
| 2015/0124098 A1* | 5/2015 | Winden | C09J 163/00 |
| | | | 348/148 |
| 2015/0222795 A1 | 8/2015 | Sauer et al. | |
| 2015/0266430 A1 | 9/2015 | Mleczko et al. | |
| 2015/0327398 A1 | 11/2015 | Achenbach et al. | |
| 2015/0365569 A1 | 12/2015 | Mai et al. | |
| 2015/0379361 A1 | 12/2015 | Boulanger | |
| 2016/0037028 A1 | 2/2016 | Biemer | |
| 2016/0191863 A1 | 6/2016 | Minikey, Jr. et al. | |
| 2016/0243987 A1 | 8/2016 | Kendall | |
| 2016/0268716 A1 | 9/2016 | Conger et al. | |
| 2016/0284752 A1 | 9/2016 | Shi | |
| 2016/0286103 A1 | 9/2016 | Van Dan Elzen | |
| 2017/0036600 A1 | 2/2017 | Whitehead et al. | |
| 2017/0054881 A1 | 2/2017 | Conger et al. | |
| 2017/0126938 A1* | 5/2017 | Newiger | G02B 7/025 |
| 2017/0129419 A1 | 5/2017 | Conger et al. | |
| 2017/0133811 A1 | 5/2017 | Conger et al. | |
| 2017/0201661 A1 | 7/2017 | Conger | |
| 2017/0280034 A1* | 9/2017 | Hess | H04N 23/57 |
| 2017/0295306 A1 | 10/2017 | Mleczko | |
| 2017/0302829 A1 | 10/2017 | Mleczko et al. | |
| 2018/0027151 A1 | 1/2018 | Kazama et al. | |
| 2018/0033741 A1 | 2/2018 | Dubey et al. | |
| 2018/0042106 A1 | 2/2018 | Scheja | |
| 2018/0072239 A1 | 3/2018 | Wienecke et al. | |
| 2018/0098033 A1 | 4/2018 | Mleczko et al. | |
| 2018/0364441 A1* | 12/2018 | Hubert | H04N 23/687 |
| 2019/0121051 A1 | 4/2019 | Byrne et al. | |
| 2019/0124238 A1 | 4/2019 | Byrne et al. | |
| 2019/0124243 A1 | 4/2019 | Mleczko et al. | |
| 2019/0129281 A1* | 5/2019 | Chen | H04N 23/55 |
| 2019/0137724 A1* | 5/2019 | Kim | G02B 7/02 |
| 2019/0166289 A1 | 5/2019 | Knutsson et al. | |
| 2019/0306966 A1 | 10/2019 | Byrne et al. | |
| 2019/0326725 A1* | 10/2019 | Nagatomo | H01S 5/02375 |
| 2019/0355606 A1 | 11/2019 | Flotgen | |
| 2020/0001787 A1 | 1/2020 | Lu et al. | |
| 2020/0033549 A1 | 1/2020 | Liu et al. | |
| 2020/0070453 A1* | 3/2020 | Piotrowski | B29D 11/00644 |
| 2020/0137926 A1 | 4/2020 | Wohlte | |
| 2020/0154020 A1 | 5/2020 | Byrne et al. | |
| 2020/0172019 A1* | 6/2020 | Ding | G03B 17/12 |
| 2020/0204711 A1 | 6/2020 | Guidi et al. | |
| 2020/0333619 A1* | 10/2020 | Ang | G02B 5/208 |
| 2020/0409016 A1* | 12/2020 | Jiang | G02B 7/003 |
| 2020/0412925 A1 | 12/2020 | Byrne et al. | |

* cited by examiner

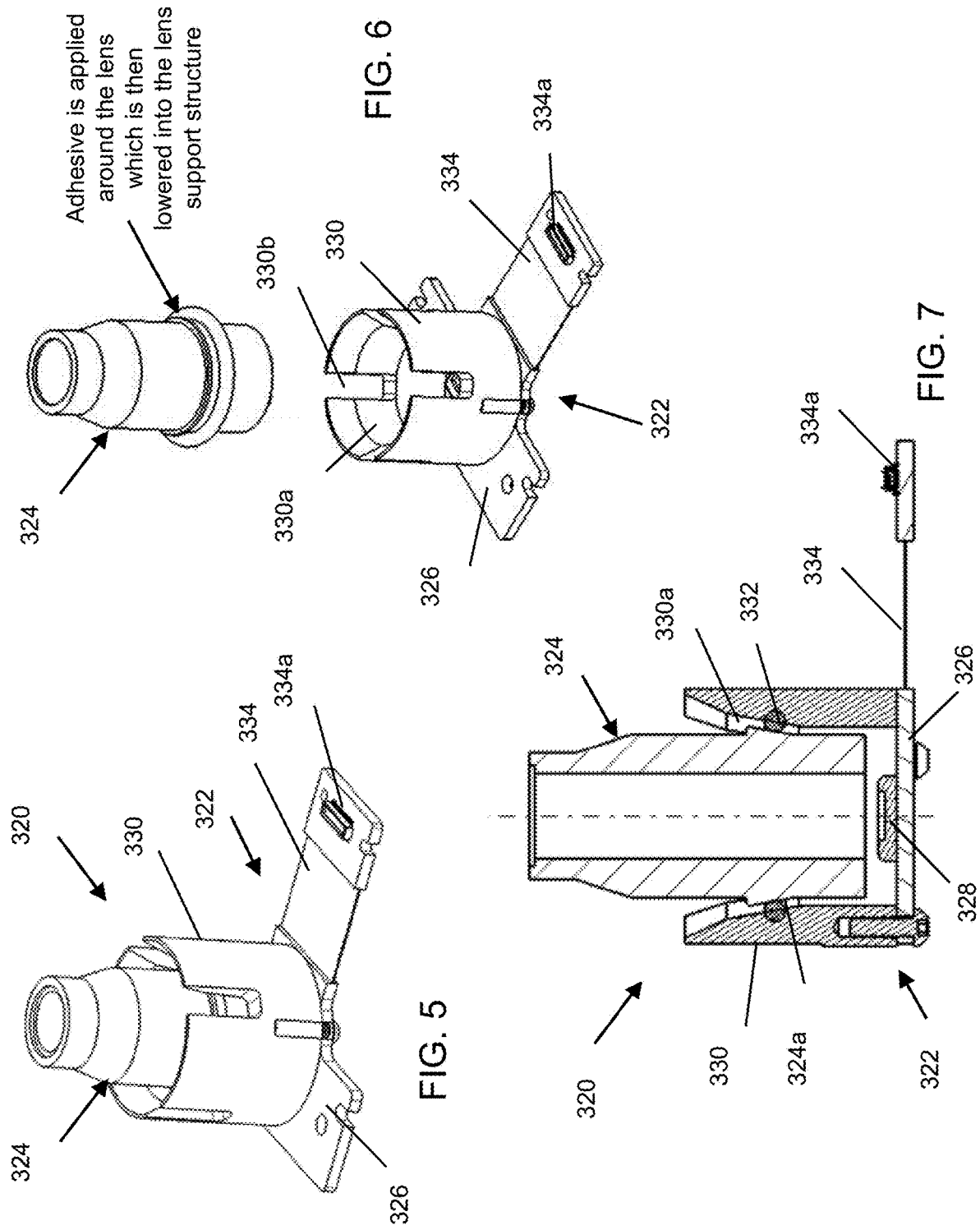

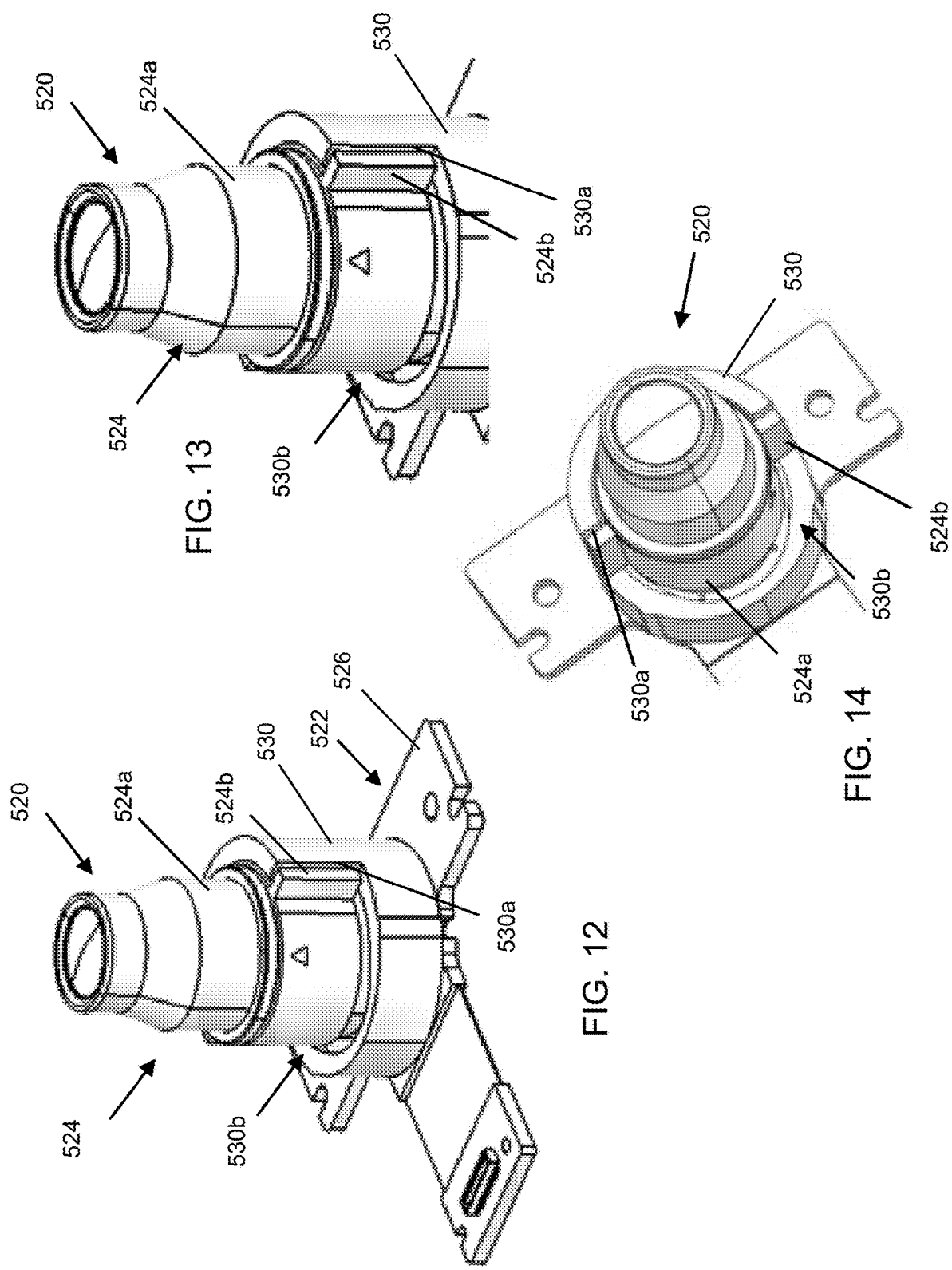

VEHICULAR CAMERA WITH ADHESIVE DISPOSED BETWEEN NON-AXIALLY OPPOSED SURFACES OF THE LENS BARREL AND PCB STRUCTURE

CROSS REFERENCE TO RELATED APPLICATIONS

The present application is a continuation of U.S. patent application Ser. No. 16/948,970, filed Oct. 8, 2020, now U.S. Pat. No. 11,579,400, which claims the filing benefits of U.S. provisional application Ser. No. 62/939,067, filed Nov. 22, 2019, U.S. provisional application Ser. No. 62/913,288, filed Oct. 10, 2019, and U.S. provisional application Ser. No. 62/912,214, filed Oct. 8, 2019, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of cameras in vehicle imaging systems is common and known. Examples of such known systems are described in U.S. Pat. Nos. 8,542,451; 7,965,336; 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) disposed at a vehicle and having a field of view exterior of the vehicle. A control comprises an image processor that is operable to process image data captured by the camera. The control, responsive to image processing of image data captured by the camera, is operable to provide driver assistance or driving assistance, such as for assisting a driver in driving the vehicle or for providing autonomous or semi-autonomous control of the vehicle, or such as for providing a display of video images for viewing by the driver, such as during a reversing or parking maneuver.

According to an aspect of the present invention, the vehicular camera includes a camera housing, a printed circuit board (PCB) having an imager disposed thereat, a lens barrel (accommodating a lens assembly having at least one lens element or optic). The lens barrel is adhesively coupled to the PCB via attachment using a cured adhesive. The adhesive is disposed circumferentially around the lens barrel at a cylindrical or conical surface of a lens barrel support structure protruding from the PCB. With the lens barrel flange adhesively bonded or coupled to the lens barrel support structure at the PCB, the imager is optically aligned with the lens supported at or accommodated at the lens barrel. The adhesive, due to it being circumferentially disposed around the lens barrel at radially opposed surfaces (of the lens barrel and the lens barrel support structure) limits or substantially eliminates post-cure adhesive shrinkage effects on the camera focus.

These and other objects, advantages, purposes and features of the present invention will become apparent upon review of the following specification in conjunction with the drawings.

BRIEF DESCRIPTION OF THE DRAWINGS

FIG. 5 is a perspective view of another lens-imager assembly in accordance with the present invention;

FIG. 6 is an exploded view of the lens-imager assembly of FIG. 5;

FIG. 7 is a sectional view of the lens-imager assembly of FIG. 5;

FIG. 12 is a perspective view of another lens-imager assembly in accordance with the present invention;

FIG. 13 is another perspective view of a portion of the lens-imager assembly of FIG. 12; and FIG. 14 is an upper perspective view of the lens-imager assembly of FIG. 12.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and to provide an output to a display device for displaying images representative of the captured image data. Optionally, the vision system may provide display, such as a rearview display or a top down or bird's eye or surround view display or the like.

Figure 1:
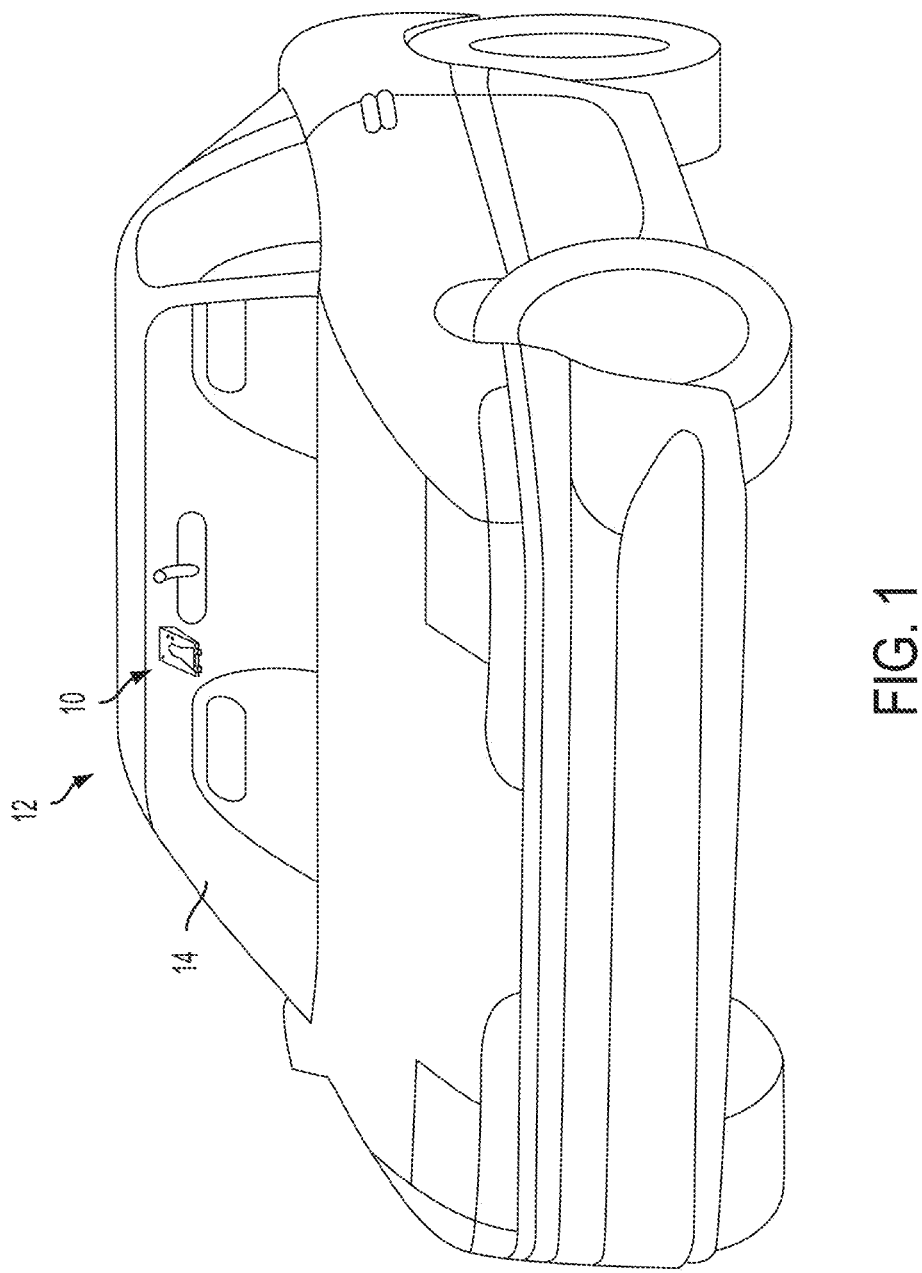
FIG. 1 is a perspective view of a vehicle with a vision system that incorporates cameras in accordance with the present invention.

Referring now to the drawings and the illustrative embodiments depicted therein, a vision system 10 for a vehicle 12 includes at least one exterior viewing imaging sensor or camera, such as a forward viewing imaging sensor or camera, which may be disposed at an in-cabin side of the windshield 14 and behind the windshield of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. Optionally, a camera may be disposed inside the vehicle with a field of view interior of the vehicle, such as for a driver monitoring system or passenger or baby monitoring system or the like.

As shown in FIG. 1, the forward viewing camera may be disposed at the windshield of the vehicle and view through the windshield and forward of the vehicle, such as for a driving assist system (such as for traffic sign recognition, headlamp control, pedestrian detection, collision avoidance, lane marker detection and/or the like). The vision system 10 includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

Positioning and securing the lens relative to the imager is critical in camera design. This holds especially true in automotive video camera design because of the stringent environment requirements in the automobile industry. For example, the safety requirements in the automobile require high image quality stability. Poor lens joint design can lead to large camera focus variation throughout the camera's lifetime.

Figure 2:
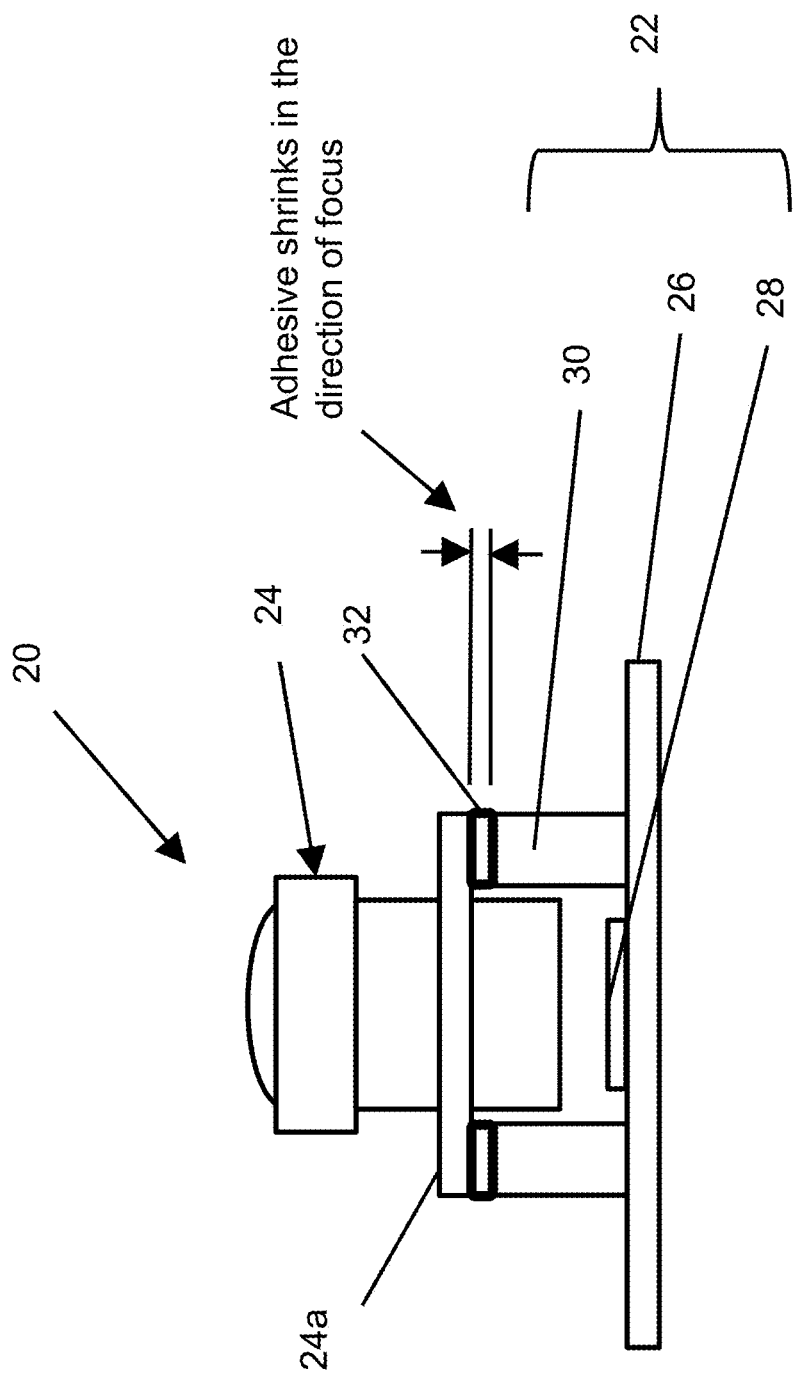
FIG. 2 is a cross-section of a lens-imager assembly using adhesive disposed between a lens support structure and a flange of the lens barrel.

Permanent focus cameras are a common solution for the automotive industry to optimize cost and robustness. These cameras are frequently assembled with a layer of quick-cure adhesive between the lens barrel and sensor assembly. This method allows them to be freely positioned with respect to each other in 5 to 6 degrees of freedom before the adhesive is cured to permanently hold them in place. The adhesive is most often placed within a compliance gap arranged about the radial axis of the lens barrel cylinder, such as shown in FIG. 2. This allows for adhesive placement on the sensor assembly surface prior to lens placement.

Adhesive post-cure shrinkage can lead to change in focus of the camera due to the adhesive being disposed between a flange of the lens barrel and a lens support structure of the printed circuit board (PCB) and imager (where the flange and the lens support structure bonding surfaces are axially opposed to one another). For example, and such as shown in FIG. 2, an imaging assembly 20 comprises a sensor assembly 22 and a lens barrel 24 (that accommodates a lens assembly having one or more lens elements or optics disposed axially along and within the lens barrel). The sensor assembly 22 comprises a printed circuit board (PCB) 26 having an imager or imaging sensor 28 disposed thereat. The lens barrel 24 includes a flange 24a that provides an annular surface that is mated with and bonded to an annular surface of a lens support structure 30 that protrudes from the PCB 26 (or is otherwise joined with or incorporated on the PCB) via an adhesive layer 33. The adhesive is disposed between axially opposed surfaces (i.e., the surfaces are spaced apart in the axial direction or along the longitudinal axis of the lens and lens barrel and normal to the imaging plane). With such a construction, shrinkage of the adhesive results in a change of focal length of the lens with respect to the imager, such that post-cure adhesive shrinkage may result in the camera being slightly out of focus. The imaging assembly 20 is disposed at a camera housing (not shown) that encases the PCB and that is attached to the PCB or structure or lens barrel via adhesive and/or fasteners.

Accuracy for optimal focus and alignment is a challenge with the imaging assembly of FIG. 2 because the adhesive will shrink and then change the position of the lens relative to the sensor assembly. As a countermeasure, the relative position between the lens and sensor assembly may be increased before the adhesive is cured in a way that allows the lens to end up in an ideal position (relative to the imager) after the adhesive is cured and has shrunk. This pre-cure position adjustment is not perfect because the amount of adhesive shrinkage is not consistent. Precise and minimal amounts of adhesive are used to reduce this post-cure adhesive shrinkage effect as much as possible. However, the post-cure adhesive shrinkage effect becomes an issue for the focus needs of cameras used for high-resolution vehicle displays and machine vision systems.

Figure 3:
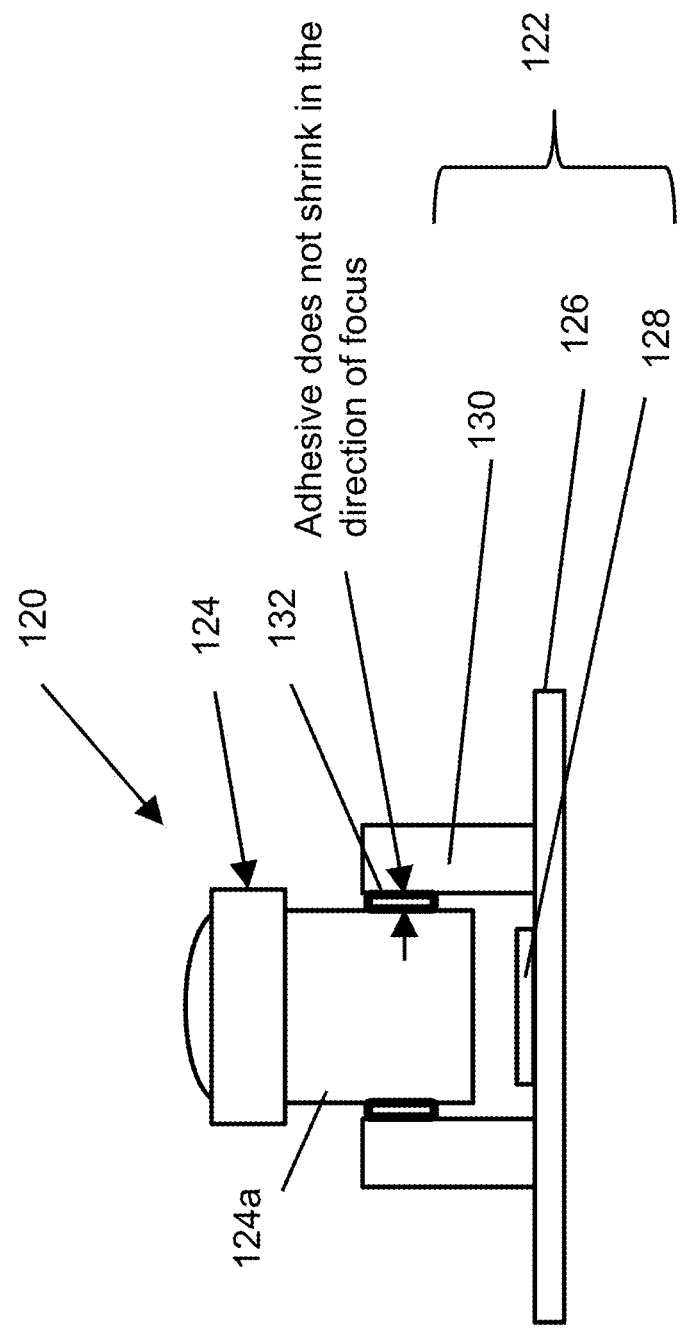
FIG. 3 is a cross-section of a lens-imager assembly in accordance with the present invention, with the adhesive disposed between the lens barrel and a lens support structure of the sensor assembly.

Referring now to FIG. 3, an imaging assembly 120 includes a sensor assembly 122 and a lens barrel assembly 124. The sensor assembly 122 comprises a printed circuit board (PCB) 126 having an imager or imaging sensor 128 disposed thereat, with a lens barrel support structure 130 that protrudes from the PCB 126 (or is otherwise joined with or incorporated at the PCB). The lens barrel assembly 124 accommodates a lens or lens assembly having one or more lens elements or optics disposed axially along and within the lens barrel. The lens barrel 124 has a cylindrical barrel portion 124a that provides a cylindrical outer surface that is mated with and bonded to a cylindrical inner surface of the lens barrel support structure 130 that protrudes from the PCB 126 via an adhesive layer 132. As can be seen with reference to FIG. 3, the adhesive 132 is disposed circumferentially around the lens barrel and between and contacting the radially opposed cylindrical surfaces of the lens barrel and the lens barrel support structure (i.e., opposing or facing surfaces that are spaced apart in a radial direction with the adhesive disposed at and spanning the gap between the radially opposed surfaces), such that any fluctuation or shrinkage/expansion of the adhesive results in a shift of the lens barrel relative to the imager in a direction other than in the direction of focus. The imaging assembly 120 is disposed at a camera housing (not shown) that encases the PCB and that is attached to the PCB or structure or lens barrel via adhesive and/or fasteners. Optionally, the PCB may be fastened to the housing and the housing may provide the lens barrel support structure for adhesively bonding the sensor assembly to the lens barrel.

The opposing cylindrical surfaces of the lens barrel and the lens barrel support structure are dimensioned to provide or establish an appropriate gap size or bond line thickness for the adhesive that is disposed in the gap and contacting the opposing surfaces. For example, the inner surface of the lens barrel support structure may have a radius (the dimension from the axis of the lens barrel support structure to the inner surface) that is slightly greater than the radius of the outer surface of the lens barrel (the dimension from the axis of the lens barrel to the outer surface), such that there is a gap between the opposed bonding surfaces (e.g., having a gap dimension that is less than approximately 1 mm or less than or equal to 0.5 mm, and such as greater than or equal to around 0.25 mm). The lens barrel thus may be inserted axially into the lens barrel support structure (not threaded into the structure) and adjusted and tilted relative to the lens barrel support structure (with the adhesive disposed in the gap but not yet cured) to optically align and focus the lens relative to the imager. Thus, with the uncured adhesive dispensed in the gap and contacting the bonding surfaces, the robot (holding the lens barrel or the PCB) can adjust the lens barrel relative to the PCB and imager along the x, y and z axes and can adjust the yaw, pitch and roll of the lens barrel relative to the PCB and imager to optically align the lens relative to the imager. With the lens optically aligned with the imager, the adhesive is cured or at least partially cured (such as via UV curing or the like) to retain the lens barrel at the lens barrel support structure.

This imaging assembly reduces or removes the effect of adhesive shrink on focus change. This is done by placing the adhesive along surfaces that are in line with or parallel to the focus direction axis (the longitudinal axis of the lens barrel and lens assembly, which is normal to the imaging plane of the imager) or, in other words, placing the adhesive between surfaces that are normal to or at least not parallel to the imaging plane of the imager. Adhesive cure shrink then occurs radially about the lens axis instead of in the direction of focus. This assembly process eliminates the need for post-cure shrink compensation and sources of focus error. Any lens alignment changes due to adhesive shrink are minimized by placing the adhesive uniformly around the lens barrel to balance the effect (or alternatively, if adhesive dots are used, each adhesive dot is disposed or placed diametrically opposite another adhesive dot). Furthermore, changes in alignment in this direction (parallel to the plane of the imager) can be readily corrected or calibrated for with digital adjustment (which cannot be done for changes in focus).

Figure 4:
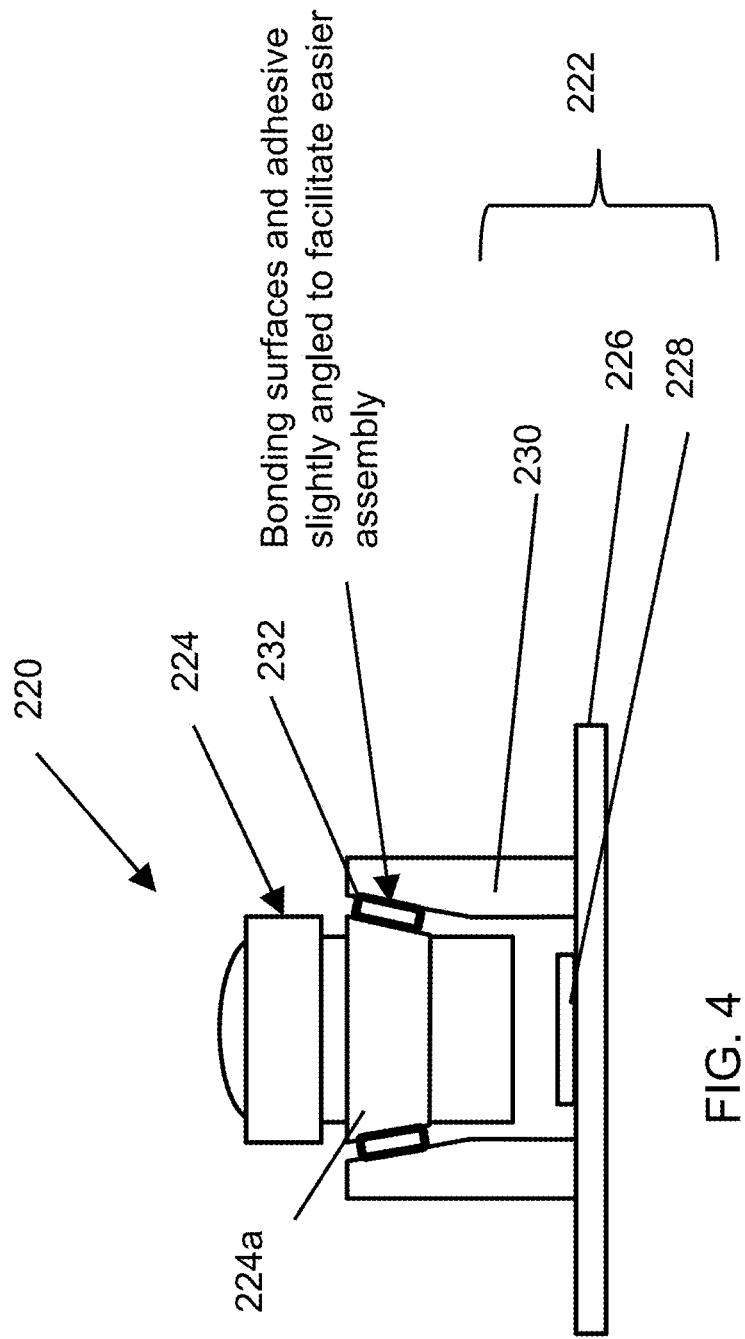
FIG. 4 is a cross-section of another lens-imager assembly in accordance with the present invention, with the lens barrel and lens support structure having conical surfaces.
Figure 9:
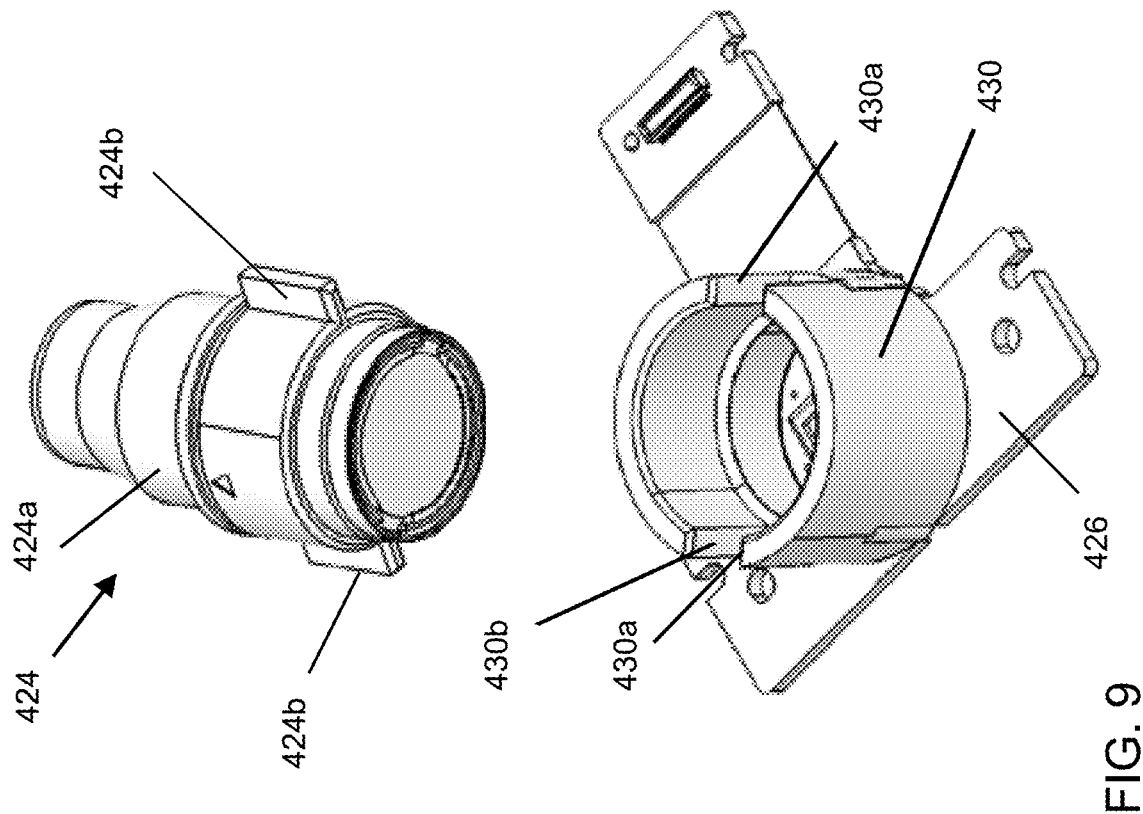
FIG. 9 is an exploded perspective view of the lens-imager assembly of FIG. 8.
Figure 8:
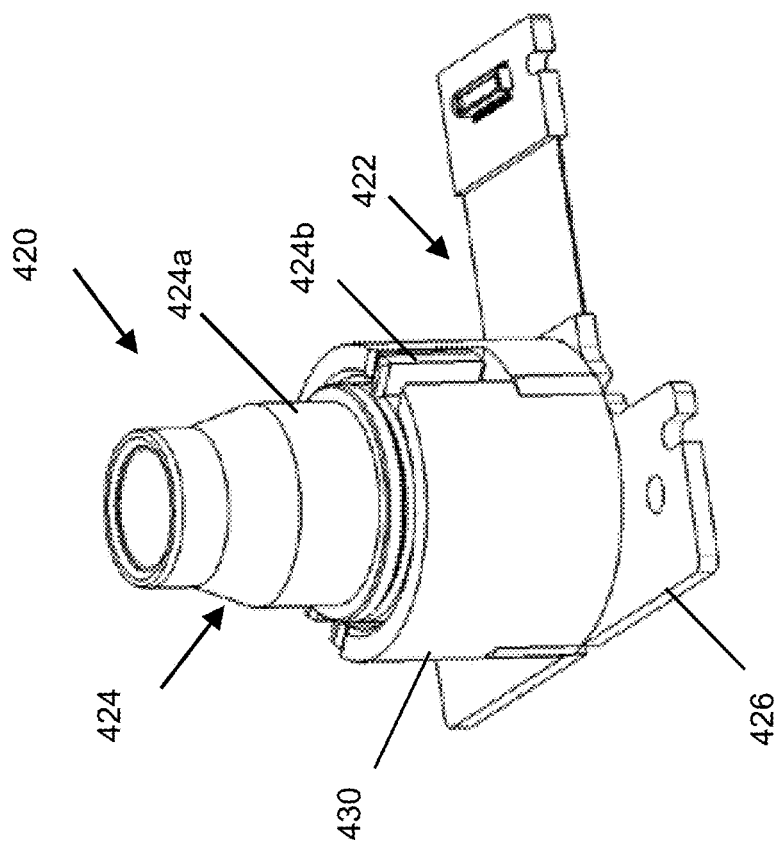
FIG. 8 is a perspective view of another lens-imager assembly in accordance with the present invention.
Figure 11:
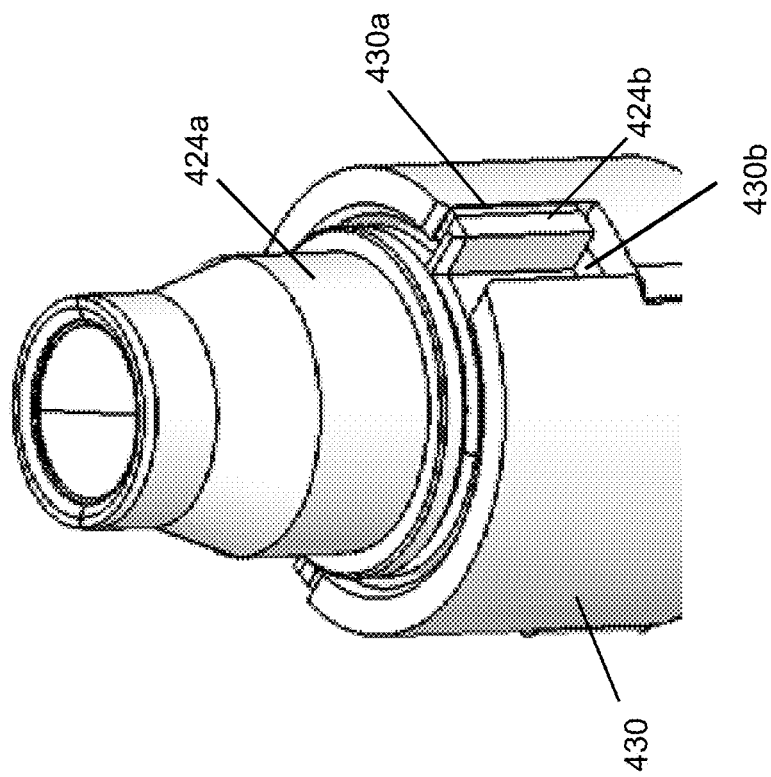
FIG. 11 is another perspective view of a portion of the lens-imager assembly of FIG. 8.
Figure 10:
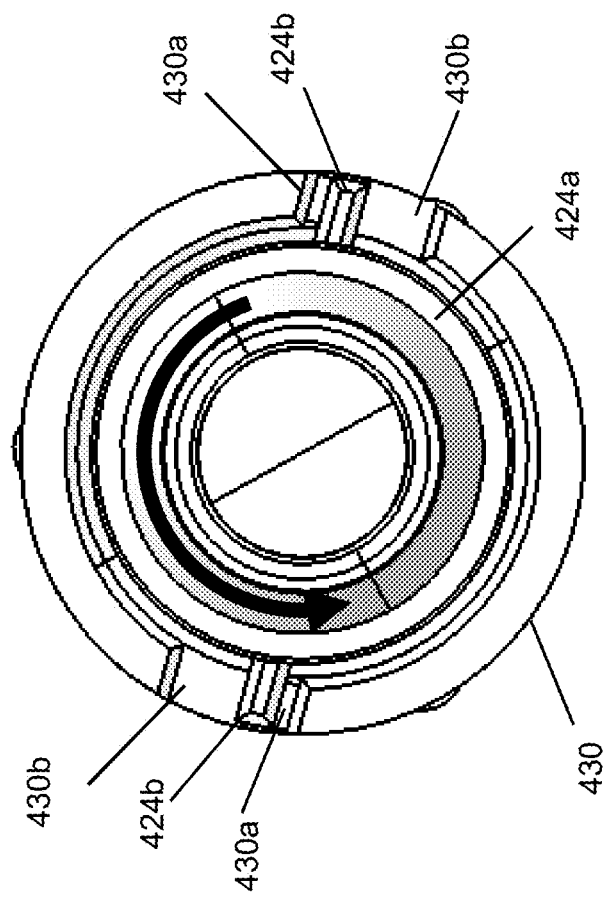
FIG. 10 is a top plan view of the lens-imager assembly of FIG. 8.

Optionally, to assist with the assembly process, the adhesive bonding surfaces can be tilted slightly off alignment with the focus direction. For example, and such as shown in FIG. 4, the imaging assembly 220 includes a sensor assembly 222 and a lens barrel assembly 224. The sensor assembly 222 comprises a printed circuit board (PCB) 226 having an imager or imaging sensor 228 disposed thereat, with a lens barrel support structure 230 that protrudes from the PCB 226 (or is otherwise joined with or incorporated at the PCB). The lens barrel assembly 224 accommodates a lens assembly having one or more lens elements or optics disposed axially along and within the lens barrel. The lens barrel assembly 224 has a barrel portion 224a that provides a conical surface that is mated with and bonded to a conical surface of the lens barrel support structure 230 that protrudes from the PCB 224 via an adhesive layer 232.

The opposing conical surfaces of the lens barrel and the lens barrel support structure are dimensioned to provide or establish an appropriate gap size or bond line thickness for the adhesive that is disposed in the gap and contacting the opposing surfaces. For example, at any given longitudinal or axial position along the lens barrel and lens barrel support structure construction, the inner surface of the lens barrel support structure may have a radius (the dimension from the axis of the lens barrel support structure to the inner surface at that location) that is slightly greater than the radius of the outer surface of the lens barrel (the dimension from the axis of the lens barrel to the outer surface at that location), such that there is a gap between the opposed bonding surfaces (e.g., having a gap dimension that is less than approximately 1 mm or less than or equal to 0.5 mm, and such as greater than or equal to around 0.25 mm). The lens barrel thus may be inserted axially into the lens barrel support structure (not threaded into the structure) and adjusted and tilted relative to the lens barrel support structure (with the adhesive disposed in the gap but not yet cured) to optically align and focus the lens relative to the imager. Thus, with the uncured adhesive dispensed in the gap and contacting the bonding surfaces, the robot (holding the lens barrel or the PCB) can adjust the lens barrel relative to the PCB and imager along the x, y and z axes and can adjust the yaw, pitch and roll of the lens barrel relative to the PCB and imager to optically align the lens relative to the imager. With the lens optically aligned with the imager, the adhesive is cured or at least partially cured (such as via UV curing or the like) to retain the lens barrel at the lens barrel support structure.

As can be seen in FIG. 4, the adhesive 232 is disposed circumferentially around the lens barrel and between the opposing conical surfaces of the lens barrel and the lens barrel support structure, such that any fluctuation or shrinkage/expansion of the cured adhesive results primarily in a shift of the lens barrel relative to the imager in a direction other than in the direction of focus. The angled surface of the lens barrel support structure (that narrows toward the PCB so that the wider end of the angled or conical surface is away from the PCB for receiving the lens barrel thereat) allows the adhesive to be dispensed at either the conical surface of the lens barrel or the conical surface of the lens barrel support structure, whereby the lens barrel is inserted into or received at the lens barrel support structure to engage with or mate with the lens barrel support structure. The angle of the bonding surface relative to the longitudinal axis of the lens barrel may be, for example, less than or equal to about 30 degrees, such as less than or equal to about 20 degrees, or less than or equal to about 10 degrees, such as, for example, 5 degrees. The imaging assembly 220 is disposed at a camera housing (not shown) that encases the PCB and that is attached to the PCB or structure or lens barrel via adhesive and/or fasteners. Optionally, the PCB may be fastened to the housing and the housing may provide the lens barrel support structure for adhesively bonding the sensor assembly to the lens barrel.

Referring now to FIGS. 5-7, another imaging assembly 320 includes a sensor assembly 322 and a lens barrel assembly 324. The sensor assembly 322 comprises a printed circuit board (PCB) 326 having an imager or imaging sensor 328 disposed thereat, with a lens barrel support structure 330 that protrudes from the PCB 326. As shown in FIGS. 5-7, the lens barrel support structure is fastened to the PCB 326 via one or more fasteners or screws (but could otherwise be joined with or incorporated at the PCB). The lens barrel assembly 324 accommodates a lens assembly having one or more lens elements or optics disposed axially along and within the lens barrel. The lens barrel assembly 324 has a barrel portion 324a that provides a conical surface that is mated with and bonded to a conical surface 330a of the lens barrel support structure 330 that protrudes from the PCB 324 via an adhesive layer 332. The sensor assembly 322 includes a flexible connector 334 (such as a flexible circuit or ribbon cable) that is electrically connected to circuitry of the PCB and that has an electrical connector 334a at its distal end for electrically connecting to circuitry of the camera assembly when the lens-imager assembly or imaging assembly is mounted at a camera housing, such as via fasteners that are inserted through apertures or holes at the side regions of the PCB (such as by utilizing aspects of the camera assemblies described in U.S. Pat. Nos. 9,596,387 and/or 9,871,971, which are hereby incorporated herein by reference in their entireties).

The adhesive 332 thus may be applied around the lens barrel (at the conical surface of the barrel portion 324a, and then the lens barrel may be lowered into the lens barrel support structure 330. As can be seen in FIGS. 5-7, the lens barrel support structure 330 is flared outward at its outer or distal end (the end opposite from the end that attaches at the PCB 326) to facilitate and ease insertion of the lens barrel into the support structure. The cross dimensions of the conical surface portions of the lens barrel and lens barrel support structure are selected to allow some adjustment along the longitudinal axis of the lens barrel to optically align and focus the lens at the imager (as shown in FIG. 7). Thus, with the uncured adhesive dispensed in the gap and contacting the bonding surfaces, the robot (holding the lens barrel or the PCB) can adjust the lens barrel relative to the PCB and imager along the x, y and z axes and can adjust the yaw, pitch and roll of the lens barrel relative to the PCB and imager to optically align the lens relative to the imager. After the lens is optically aligned and focused with the imager (with the adhesive disposed between and contacting the bonding surfaces), the adhesive is cured and the imaging assembly 320 is mounted at a camera housing, such as for a forward facing camera that is configured to be disposed at an in-cabin surface of a vehicle windshield so as to view forward of the vehicle through the vehicle windshield.

In the illustrated embodiment, the lens barrel support structure includes notches or slots 330b. The slots or notches provide openings or UV-light-transmitting regions around the lens barrel support structure to allow for UV light access to the adhesive joint between the lens barrel and the lens barrel support structure. Such UV light exposure may be applied during the adhesive curing process, such as during a quick initial adhesive cure step or process prior to a secondary and final heat or humidity cure step or process (such as by utilizing aspects of the cameras and systems described in U.S. Pat. Nos. 9,277,104 and/or 8,542,451, which are hereby incorporated herein by reference in their entireties).

In the illustrated embodiment, the lens barrel support structure has four spaced apart notches 330b that extend along the lens barrel support structure from the open end to at least the conical surfaces or adhesive joint location to provide UV-light-transmitting regions spaced apart around the circumference of the lens support holder. The notches or slots or apertures could be elongated or increased in number (or could extend from the opposite end of the lens barrel support structure or could comprise apertures at and spaced around the circumference of the lens barrel support structure at the adhesive joint location) to allow for support structure compliance (by allowing some flexibility in the lens barrel support structure) to accommodate adhesive cure shrink and size changes with temperature. The lens barrel support structure could be a continuous cylindrical structure (having a conical inner surface), whereby portions of the structure may comprise a UV-light-transmitting material to allow the UV light to pass therethrough during the initial cure process.

Optionally, the lens barrel may be adhesively bonded to the lens barrel support structure at a bond-line or joint that is located parallel to the longitudinal axis of the lens barrel and at a radial surface of the lens barrel support structure. The lens barrel may be lowered into place at the lens barrel support structure and then rotated or shifted to engage or mate the bonding surfaces of the lens barrel with the bonding surfaces of the lens barrel support structure. For example, and such as shown in FIGS. 8-12, the imaging assembly 420 includes a sensor assembly 422 and a lens assembly 424. The sensor assembly 422 comprises a printed circuit board (PCB) 426 having an imager or imaging sensor disposed thereat, with a lens barrel support structure 430 that protrudes from the PCB. The lens barrel assembly 424 accommodates a lens assembly having one or more lens elements or optics disposed axially along and within the lens barrel. The lens barrel assembly 424 has a barrel portion 424a that has a pair of flanges 424b that protrude radially outward along the barrel portion 424a to provide bonding surfaces disposed at diametric opposite sides of the lens barrel portion and that extend along or parallel to the longitudinal axis of the lens barrel. The surfaces of the flanges 424b are configured to engage bonding surfaces 430a of the lens barrel support structure 430 to secure or bond the lens barrel at the lens barrel support structure.

The flanges or adhesive mount features 424b may be a separate threaded on part (such as a ring that has the flanges protruding therefrom and that is threaded onto the barrel portion 424a of the lens barrel 424) for lens cost reduction or may be formed as part of the lens barrel itself. The mount features or flanges may be oriented with respect to the sensor to optimize performance of the camera. The adhesive is applied to the lens barrel flanges (or optionally, the adhesive may be applied or dispensed onto the bonding surfaces of the lens barrel support structure) and the lens barrel is then lowered into the lens barrel support structure with clearance between the flanges 424b and the bonding surfaces 430a to avoid disturbing the adhesive. In the illustrated embodiment, the lens barrel support structure has a pair of slots or notches 430b that are formed along the cylindrical body of the lens barrel support structure and that are sized to receive the flanges 424b as the lens barrel is lowered into the lens barrel support structure, with clearance between the adhesive on the flanges 424a and the bonding surfaces 430a of the lens barrel support structure.

After the lens barrel 424 is lowered into the lens barrel support structure 430, the lens barrel 424 is then turned or rotated (see FIG. 10) such that the adhesive contacts the bonding surfaces 430a of the lens barrel support structure 430. Optionally, the adhesive may be disposed at the bonding surfaces of the lens barrel support structure, and the lens barrel may be lowered into the lens barrel support structure and then rotated until the flanges contact the adhesive at the bonding surfaces. After the lens barrel is rotated to mate the bonding surfaces (with the uncured adhesive then contacting both bonding surfaces), the lens barrel and lens is then moved for focus and alignment relative to the imager at the sensor assembly. Thus, with the uncured adhesive dispensed in the gap and contacting the bonding surfaces (after initial rotation or moving of the lens barrel relative to the lens barrel support structure to engage the adhesive with both bonding surfaces, such as with a gap between the bonding surfaces of less than about 1 mm or less than about 0.5 mm and greater than about 0.25 mm or thereabouts), the robot (holding the lens barrel or the PCB) can adjust the lens barrel relative to the PCB and imager along the x, y and z axes and can adjust the yaw, pitch and roll of the lens barrel relative to the PCB and imager to optically align the lens relative to the imager. The adhesive bond line is vertically oriented and accessible to UV light for curing the adhesive after the lens is focused and aligned with the imager.

Optionally, the lens barrel and lens barrel support structure may be configured to allow the lens barrel to be lowered into the lens barrel support structure and then laterally shifted such that the adhesive contacts the bonding surfaces of the lens barrel support structure and the flanges. For example, and such as shown in FIGS. 12-14, an imaging assembly 520 includes a sensor assembly 522 and a lens assembly 524. The sensor assembly 522 comprises a printed circuit board (PCB) having an imager or imaging sensor disposed thereat, with a lens barrel support structure 530 that protrudes from the PCB. The lens barrel 524 and lens barrel support structure 530 are configured to allow the lens barrel to be lowered into the lens barrel support structure (with adhesive disposed at the flanges 524b protruding radially from the barrel portion 524a of the lens barrel or at the bonding surfaces 530a of the lens barrel support structure)

and then laterally shifted such that the adhesive disposed at the flanges (or optionally at the bonding surfaces of the lens barrel support structure) contacts the bonding surfaces of the lens barrel support structure (or optionally the surfaces of the flanges). In the illustrated embodiment, the lens barrel support structure 530 has a cutout region 530b at the cylindrical body portion of the lens barrel support structure 530 to provide clearance for the flanges to be lowered into the cutout region. After the lens barrel is fully lowered, the lens barrel (and flanges) is laterally moved in a direction perpendicular to the longitudinal axis of the lens barrel support structure to move the center axis of the lens barrel toward and generally into alignment with the center axis of the lens barrel support structure. Thus, with the uncured adhesive dispensed in the gap and contacting the bonding surfaces (after initial rotation or moving of the lens barrel relative to the lens barrel support structure to engage the adhesive with both bonding surfaces, such as with a gap between the bonding surfaces of less than about 1 mm or less than about 0.5 mm and greater than about 0.25 mm or thereabouts), the robot (holding the lens barrel or the PCB) can adjust the lens barrel relative to the PCB and imager along the x, y and z axes and can adjust the yaw, pitch and roll of the lens barrel relative to the PCB and imager to optically align the lens relative to the imager. After the lens is moved or adjusted for focus and alignment with the imager at the PCB, the adhesive is at least partially cured to secure the lens barrel and lens relative to the lens barrel support structure and PCB and imager.

Thus, the adhesive disposed between radially opposing surfaces of the lens barrel support structure and the lens barrel and/or surfaces that are vertically oriented or parallel to the axis of the lens barrel support structure and the lens barrel can be initially quick-cured to an initial cured state after the lens is optically aligned and focused at the imager, so that the lens support-lens barrel construction retains the lens barrel relative to the lens barrel support structure and the imager to allow the construction to be moved to a further curing station that may further cure the adhesive to a further cured state, such as via heat or humidity or the like.

Gluing or bonding the lens barrel and the imager PCB in this way (with the adhesive disposed between radially opposed surfaces of the lens barrel and lens barrel support structure and/or with the adhesive disposed between axially aligned surfaces that extend parallel to the longitudinal axis of the lens barrel) results in movement of the lens relative to the imager caused by shrinkage and expansion of the cured adhesive during temperature variation being in a direction parallel to the imager plane and not along the focus axis of the lens. This is because any shrinkage or expansion of the cured adhesive will laterally move the lens relative to the imager, and any such lateral movement (if it occurs at all) can be accommodated for via digital image processing of image data captured by the camera. Thus, the imager is optically aligned with the lens supported at the lens barrel and the lens remains focused at the imager.

The adhesive may comprise any suitable adhesive, such as a UV-cured adhesive that, when cured, secures the lens barrel and PCB at the camera housing portion in a manner suitable for use of the camera in a vehicle. The adhesive may comprise an adhesive that is cured to a first cure level via exposure of the adhesive via a UV or light curing process and that is cured to a second greater cure level via a thermal or humidity curing process. For example, the adhesive may be of the types described in U.S. Pat. Nos. 9,277,104 and/or 8,542,451, which are hereby incorporated herein by reference in their entireties.

The camera may comprise suitable construction for controlling or accommodating changes in the camera (such as different degrees of expansion and contraction of different components of the camera) when the camera is exposed to extreme temperatures, such as below −20 degrees C. or below −40 degrees C. and/or above 60 degrees C. or above 80 degrees C., and may utilize aspects of the cameras described in U.S. Pat. Nos. 10,676,041; 9,277,104; 9,233,641; 8,542,451 and/or 7,965,336, and/or U.S. Publication Nos. US-2013-0242099; US-2014-0373345; US-2015-0222795; US-2015-0266430; US-2015-0365569; US-2016-0037028; US-2016-0268716; US-2017-0054881; US-2017-0133811; US-2017-0295306; US-2017-0302829; US-2019-0124238; US-2019-0124243; US-2019-0306966; US-2020-0001787; US-2020-0033549; US-2020-0137926 and/or US-2020-0154020, and/or U.S. patent application Ser. No. 16/946,516, filed Jun. 25, 2020, now U.S. Pat. No. 11,240,411, which are all hereby incorporated herein by reference in their entireties. Optionally, electrical connections in the camera may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

The vision system or driving assist system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472;

US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera, the vehicular camera comprising:
   a printed circuit board (PCB) having a first side and a second side separated by a thickness of the PCB, wherein an imager is disposed at the first side of the PCB;
   a lens barrel accommodating a lens comprising a plurality of lens optics, the lens barrel comprising an inner end and an outer end;
   wherein the lens barrel comprises first and second flanges protruding radially outward from a cylindrical portion of the lens barrel and between the inner end and the outer end;
   wherein the first and second flanges extend radially outward from the cylindrical portion and partially along a length of the lens barrel between the inner end and the outer end;
   a lens barrel support structure disposed at the first side of the PCB, wherein the lens barrel support structure extends from the first side of the PCB and at least partially circumscribes the imager, and wherein the lens barrel support structure is configured to at least partially receive the lens barrel therein;
   wherein the lens barrel support structure comprises a wall structure having an outer side and an inner side separated by a thickness of the wall structure, wherein the wall structure has first and second slots formed through the wall structure;
   wherein the lens barrel support structure comprises a bonding surface that extends across the wall structure between the inner side and the outer side at each of the first slot and the second slot;
   wherein the bonding surfaces of the lens barrel support structure comprise surfaces that are parallel to and extend along a longitudinal axis of the lens barrel support structure;
   wherein, with the lens barrel at least partially received at the lens barrel support structure so that the inner end of the lens barrel opposes the first side of the PCB, the first flange of the lens barrel is disposed in the first slot of the lens barrel support structure and the second flange of the lens barrel is disposed in the second slot of the lens barrel support structure;
   wherein an adhesive, in an uncured state, is (i) disposed between the first flange and the bonding surface at the first slot of the lens barrel support structure and (ii) disposed between the second flange and the bonding surface at the second slot of the lens barrel support structure;
   wherein the lens barrel is at least partially received at the lens barrel support structure, and wherein the lens barrel is adjusted relative to the lens barrel support structure to move the first flange into engagement with the bonding surface at the first slot and to move the second flange into engagement with the bonding surface at the second slot so that the uncured adhesive is disposed between and contacts the respective flanges and the bonding surface at the respective slots of the lens barrel support structure; and
   wherein, with the imager aligned with the lens accommodated at the lens barrel, the adhesive is cured to adhesively attach the lens barrel at the lens barrel support structure.

2. The vehicular camera of claim 1, wherein, with the adhesive disposed between and contacting the respective flanges and the bonding surfaces at the respective slots of the lens barrel support structure and with the imager aligned with the lens accommodated at the lens barrel, shrinkage or expansion of the adhesive as the adhesive cures does not impart axial movement of the lens barrel along the longitudinal axis of the lens barrel support structure.

3. The vehicular camera of claim 1, wherein, after the lens barrel is received in the lens barrel support structure, the lens barrel is rotated about a longitudinal axis of the lens barrel relative to the lens barrel support structure to move the first flange into engagement with the bonding surface at the first slot and to move the second flange into engagement with the bonding surface at the second slot.

4. The vehicular camera of claim 1, wherein, after the lens barrel is received in the lens barrel support structure, the lens barrel is laterally moved in a direction perpendicular to a longitudinal axis of the lens barrel support structure to move the first flange into engagement with the bonding surface at the first slot and to move the second flange into engagement with the bonding surface at the second slot.

5. The vehicular camera of claim 1, wherein the wall structure of the lens barrel support structure comprises a cylindrical wall structure, and wherein the bonding surfaces extend radially across the wall structure between the inner side and the outer side at the first and second slots.

* * * * *